Patented June 11, 1940

2,203,866

UNITED STATES PATENT OFFICE 2,203,866

TREATMENT OF LATEX

Willis A. Gibbons, Montclair, and John McGavack, Leonia, N. J., assignors, by mesne assignments, to United States Rubber Company, New York, N. Y., a corporation of New Jersey No Drawing. Application August 10, 1937, Serial No. 158,336

9 Claims. (Cl. 260—819)

This invention relates to the treatment of latex and more particularly to the methods of raising the surface tension of uncompounded rubber latices.

The surface tension of the various types of uncompounded rubber latices that are commercially obtainable vary considerably. The surface tension of even the same type of rubber latex, that is, normal, centrifuged, or chemically creamed, may vary with its age, the amount of ammonia or other base used in preserving the same, and with variations in methods used for tapping the trees, and with seasonal and locational changes in tapping to obtain the fresh latex. In certain cases the rubber latex as obtained has a surface tension lower than desirable. This invention relates to methods of raising the surface tension of uncompounded latices without otherwise substantially altering the other characteristics of the material.

According to the present invention there is added to the latex a small amount of alkaline-earth salt having a solubility in water at room temperature of .3 to 5 millimoles of the metal per liter. It has been found that such alkaline-earth salts increase the surface tension of various uncompounded latices without otherwise appreciably altering the physical characteristics of the latex. If alkaline-earth salts having a solubility in water of less than .3 millimole of the metal per liter are added to the latex, there is no increase in surface tension. The addition of alkaline-earth salts having a solubility greater than 5 millimoles of the metal per liter tends to destabilize the latex and in some cases produces agglomeration and finally coagulation of the latex. It is believed that the alkaline-earth metal constituent of such a salt precipitates those substances in the latex that tend to lower the surface tension. It has been found that an amount of alkaline-earth salt equivalent to .5% by weight of the latex of the metal constituent of the salt is sufficient for all practical purposes, although greater amounts may be added. If amounts of the salt in excess of its solubility are added, the excess may be removed by settling and decanting, or by centrifuging. The preferred embodiment of the invention is calcium carbonate, and it has been found that up to .5% of the weight of calcium carbonate is sufficient for very appreciably raising the surface tension of various commercial types of latex.

Table I shows the effect of the addition of various amounts of calcium carbonate to a normal latex of about 37% total solids and 1% ammonia content. The calcium carbonate used in these examples was the type known as Gilder's whiting and was added as a solid powder with the necessary stirring to thoroughly mix the same.

Table I

| Percent by weight of $CaCO_3$ added | Calculated percent Ca by weight | Surface tension (dynes/cm.) after noted period of time | | |
|---|---|---|---|---|
| | | 3 hrs. | 1 day | 45 days |
| .00 | (Blank) | 34.3 | 34.1 | 34.2 |
| .05 | .02 | 35.1 | 36.1 | 35.9 |
| .1 | .04 | | 36.3 | 36.0 |
| .2 | .08 | | 36.3 | 36.1 |
| .5 | .2 | | 36.3 | 35.7 |

As may be seen from the above table, calcium carbonate, which has a solubility in water at room temperature of about .60 millimole of calcium per liter, raises the surface tension by over 1.5 dynes/cm. when added in amounts ranging from as low as .05% up to .5% by weight of the latex.

As may be seen from Table II below, other alkaline-earth salts having a solubility in water of .3 to 5 millimoles of metal per liter give the same effect of raising the surface tension of latex. Throughout the specification and claims magnesium is considered an alkaline-earth metal. It may be seen that magnesium carbonate, which has a solubility in water of .70 millimole of magnesium per liter, likewise raises the surface tension in a manner similar to calcium carbonate. The latices used in examples of Table II were normal latices containing about 38% total solids and 1% of ammonia. Barium carbonate and strontium carbonate, which have solubilities of barium and strontium of only .10 and .17 millimole per liter respectively, show no change in surface tension on addition to various latices. Other alkaline-earth salts than calcium and magnesium carbonates, having the requisite solubility in water of .3 to 5 millimoles of the metal per liter, are exemplified in Table II as follows:

strontium sulphate (solubility of .60 millimole of strontium per liter), barium diphosphate (solubility of .65 millimole of barium per liter), and calcium, barium and strontium citrates having respective solubilities in water of 3.0 millimoles of calcium per liter, .80 millimole of barium per liter, and 2.0 millimoles of strontium per liter.

*Table II*

| Salt added | Mols of salt added per liter of latex | Calculated weight percent of metal added | Surface tension (dynes/cm.) after noted period of time | | | | | |
|---|---|---|---|---|---|---|---|---|
| | | | 10 min. | ½ hr. | 4 hrs. | 1 day | 10 days | 45 days |
| | | Percent | | | | | | |
| MgCO₃ | .02 | .05 | | | | 36.3 | | 37.1 |
| | .05 | .1 | | | | 36.9 | | 37.2 |
| Blank | | | | | | 34.1 | | 34.2 |
| SrSO₄ | .005 | .04 | | 34.8 | | 35.7 | 36.3 | |
| | .02 | .2 | | 35.2 | | 36.2 | 37.0 | |
| Blank | | | | 33.8 | | 33.9 | 34.1 | |
| BaHPO₄ | .005 | .07 | | 37.3 | | 38.2 | 38.2 | |
| | .03 | .4 | | 38.4 | | 39.2 | 38.5 | |
| Blank | | | | 33.8 | | 33.9 | 34.1 | |
| Ca citrate | .005 | .02 | 40.7 | | 40.2 | 40.5 | 40.0 | |
| | .01 | .04 | 42.0 | | 41.5 | 41.2 | 40.4 | |
| | .02 | .08 | 42.6 | | 43.4 | 43.6 | 42.6 | |
| Blank | | | 33.9 | | 34.0 | 34.3 | 34.1 | |
| Sr citrate | .005 | .04 | 38.2 | | 38.5 | 39.0 | 38.2 | |
| | .01 | .08 | 38.7 | | 39.6 | 38.7 | 37.9 | |
| | .02 | .2 | 39.1 | | 39.1 | 38.3 | 36.1 | |
| Blank | | | 33.9 | | 34.0 | 34.3 | 34.1 | |
| Ba citrate | .005 | .07 | 38.4 | | 38.5 | 37.3 | 36.3 | |
| | .01 | .1 | 39.0 | | 38.7 | 36.8 | 35.4 | |
| | .02 | .3 | 39.8 | | 40.0 | 39.8 | 37.2 | |
| Blank | | | 33.9 | | 34.0 | 34.3 | 34.1 | |

In the above examples the magnesium carbonate was added as a solid powder and thoroughly mixed into the latex. The strontium sulphate was prepared by mixing one equivalent of strontium chloride (0.5 molar) with 1.5 equivalents of sodium sulphate (0.5 molar) and the calculated amount of suspension added to the latex. The barium di-phosphate was prepared by mixing one equivalent of barium chloride (0.5 molar) with 1.2 equivalents of di-potassium phosphate (0.5 molar) and the requisite amount added to the latex. The calcium and strontium citrates were prepared by mixing two equivalents of sodium citrate (1.0 molar) with one equivalent of calcium chloride (.5 molar). The barium citrate was prepared by mixing three equivalents of sodium citrate (1.0 molar) with one equivalent of barium chloride (0.5 molar). When a solution of sodium citrate is added to a solution of alkaline-earth chloride, an initial heavy curdy precipitate is formed which readily disolves in an excess of the citrate. Upon standing, however, a thick gelatinous precipitate slowly appears. In the case of the barium citrate, the second precipitate made its appearance in ten minutes after dissolution of the first precipitate, in the case of the strontium citrate twenty minutes, and in the case of calcium citrate one hour. In the examples of Table II the requisite amount of alkaline-earth citrate was added to the latex prior to the formation of the second permanent precipitate, and the final precipitation allowed to take place in the latex. These are merely various illustrative methods of mixing the alkaline-earth salts with latex.

Table III illustrates the application of the present invention to various types of commercial latices. The last two columns give the surface tensions of the untreated latices and the latices treated according to the present invention after a given period of time. It may be noted that in some cases the surface tension is raised by as much as 6 dynes/cm.

*Table III*

| Sample No. | Salt added | Per cent by weight of salt added | Surface tension (dynes/cm.) | |
|---|---|---|---|---|
| | | | Days after treatment | Untreated (blank) | Treated |
| | | Per cent | | | |
| I | CaCO₃ | .1 | 4 | 34.7 | 36.6 |
| | CaCO₃ | .1 | 46 | 34.4 | 36.5 |
| II | CaCO₃ | .1 | 16 | 36.0 | 37.3 |
| III | CaCO₃ | .1 | 1 | 34.2 | 36.7 |
| | CaCO₃ | .1 | 45 | 34.2 | 36.6 |
| | CaCO₃ | .5 | 1 | 34.2 | 36.5 |
| | CaCO₃ | .5 | 45 | 34.2 | 36.8 |
| | MgCO₃ | .1 | 1 | 34.2 | 34.8 |
| | MgCO₃ | .1 | 45 | 34.2 | 36.9 |
| | MgCO₃ | .5 | 1 | 34.2 | 36.2 |
| | MgCO₃ | .5 | 45 | 34.2 | 37.5 |
| IV | CaCO₃ | .1 | 13 | 35.3 | 37.8 |
| V | CaCO₃ | .1 | 13 | 36.6 | 40.7 |
| VI | CaCO₃ | .1 | 13 | 36.4 | 39.8 |
| VII | CaCO₃ | .1 | 1 | 39.5 | 44.6 |
| | CaCO₃ | .1 | 2 | 39.7 | 45.0 |
| | CaCO₃ | .5 | 1 | 39.5 | 45.5 |
| | CaCO₃ | .5 | 2 | 39.7 | 45.3 |
| VIII | CaCO₃ | .1 | 2 | 40.1 | 45.5 |
| | CaCO₃ | .5 | 2 | 40.1 | 45.0 |
| I | CaCO₃ | .1 | 1 | 37.8 | 39.4 |
| | CaCO₃ | .1 | 45 | 37.2 | 39.3 |

The following is the code of the sample numbers in the above table:

I. Normal latex; 39.6% total solids, 1.00% NH₃.

II. Normal latex; 36.0% total solids, 1.1% NH₃.

III. Normal latex preserved on estate with 1.25% NH₃. Desludged in U. S. A. by centrifuging; 39.6% total solids, 0.96% NH₃.

IV. Plantation centrifuged at room temperature; 62.0% total solids, 0.54% NH₃.

V. Fresh latex plantation creamed at 65° C. with locust bean gum; 63.5% total solids, 0.61% NH₃.

VI. Plantation creamed at room temperature with ammonium alignate; 63.5% total solids, 0.64% NH₃.

VII. Normal latex triple creamed at room temperature in U. S. A. with ammonium alignate; 63.2% total solids, 0.2% NH₃.

VIII. Triple creamed latex of sample VII diluted with water to 35% total solids.

IX. Normal latex centrifuged at room temperature in U. S. A.; 60.5% total solids, 0.43% NH₃.

It may be seen from the above illustrations that small amounts of various alkaline-earth salts having a solubility in water at room temperature of .3 to 5 millimoles of the metal per liter very appreciably raise the surface tension of various rubber latices. This is applicable to latices preserved with various bases such as ammonia, fixed alkalis, and aliphatic amines. Apparently the alkaline-earth salts precipitate those natural substances in the latex which tend to lower the surface tension and which are not precipitated or inactivated by the basic substances which are added to latex to make it sufficiently alkaline for satisfactory preservation. Other alkaline-earth salts than those exemplified in the tables above, coming within the noted solubility range may also be used in carrying out the process of the present invention. The surface tensions were obtained by means of a Du-Nouy tensiometer and were corrected by the method of Harkins and Jordan, J. Am. Chem. Soc., vol. 52, page 1751 (1930). The corrected readings are those recorded in the above tables.

As various other modifications will occur to those skilled in the art, it is not intended to limit the invention other than as set forth in the appended claims.

Having thus described our invention, what we claim and desire to protect by Letters Patent is:

1. The method of raising the surface tension of uncompounded rubber latex which comprises mixing therewith up to .5% by weight of the latex of an alkaline-earth metal in the form of a salt of the metal having a solubility in water at room temperature of .3 to 5 millimoles of the metal per liter and selected from the group consisting of calcium carbonate, magnesium carbonate, strontium sulphate, barium diphosphate, calcium citrate, strontium citrate and barium citrate.

2. The method of raising the surface tension of uncompounded rubber latex containing a base selected from the group consisting of ammonia, fixed alkalies and aliphatic amines, which comprises mixing therewith less than .5% by weight of the latex of an alkaline earth metal in the form of a salt of the metal having a solubility in water at room temperature of .3 to 5 millimoles of the metal per liter and selected from the group consisting of calcium carbonate, magnesium carbonate, strontium sulphate, barium diphosphate, calcium citrate, strontium citrate and barium citrate.

3. The method of raising the surface tension of uncompounded rubber latex containing ammonia which comprises mixing therewith less than .5% by weight of the latex of an alkaline-earth metal in the form of a salt of the metal having a solubility in water at room temperature of .3 to 5 millimoles of the metal per liter and selected from the group consisting of calcium carbonate, magnesium carbonate, strontium sulphate, barium diphosphate, calcium citrate, strontium citrate and barium citrate.

4. The method of raising the surface tension of uncompounded rubber latex which comprises mixing therewith up to .5% by weight of the latex of calcium carbonate.

5. The method of raising the surface tension of uncompounded rubber latex containing ammonia which comprises mixing therewith up to .5% by weight of the latex of calcium carbonate.

6. Uncompounded latex containing up to .5% by weight of the latex of an alkaline-earth metal in the form of a salt of the metal having a solubility in water at room temperature of .3 to 5 millimoles of the metal per liter and selected from the group consisting of calcium carbonate, magnesium carbonate, strontium sulphate, barium diphosphate, calcium citrate, strontium citrate and barium citrate.

7. Uncompounded latex containing a base selected from the group consisting of ammonia, fixed alkalies and aliphatic amines, and up to .5% by weight of the latex of calcium carbonate.

8. Uncompounded latex containing ammonia and up to .5% by weight of the latex of an alkaline-earth metal in the form of a salt of the metal having a solubility in water at room temperature of .3 to 5 millimoles of the metal per liter and selected from the group consisting of calcium carbonate, magnesium carbonate, strontium sulphate, barium diphosphate, calcium citrate, strontium citrate and barium citrate.

9. Uncompounded latex containing up to .5% by weight of the latex of calcium carbonate.

WILLIS A. GIBBONS.
JOHN McGAVACK.